Patented Feb. 16, 1926.

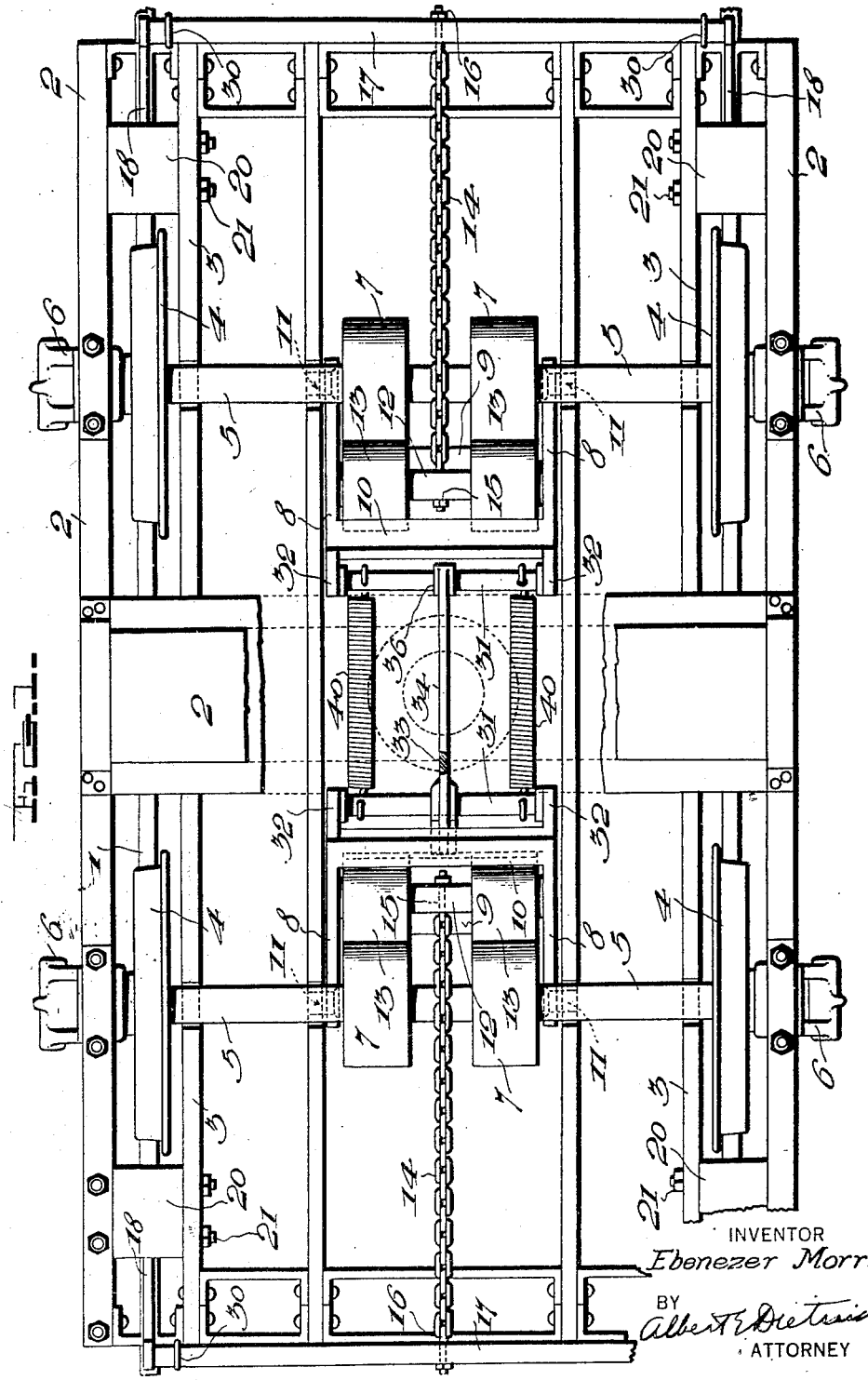

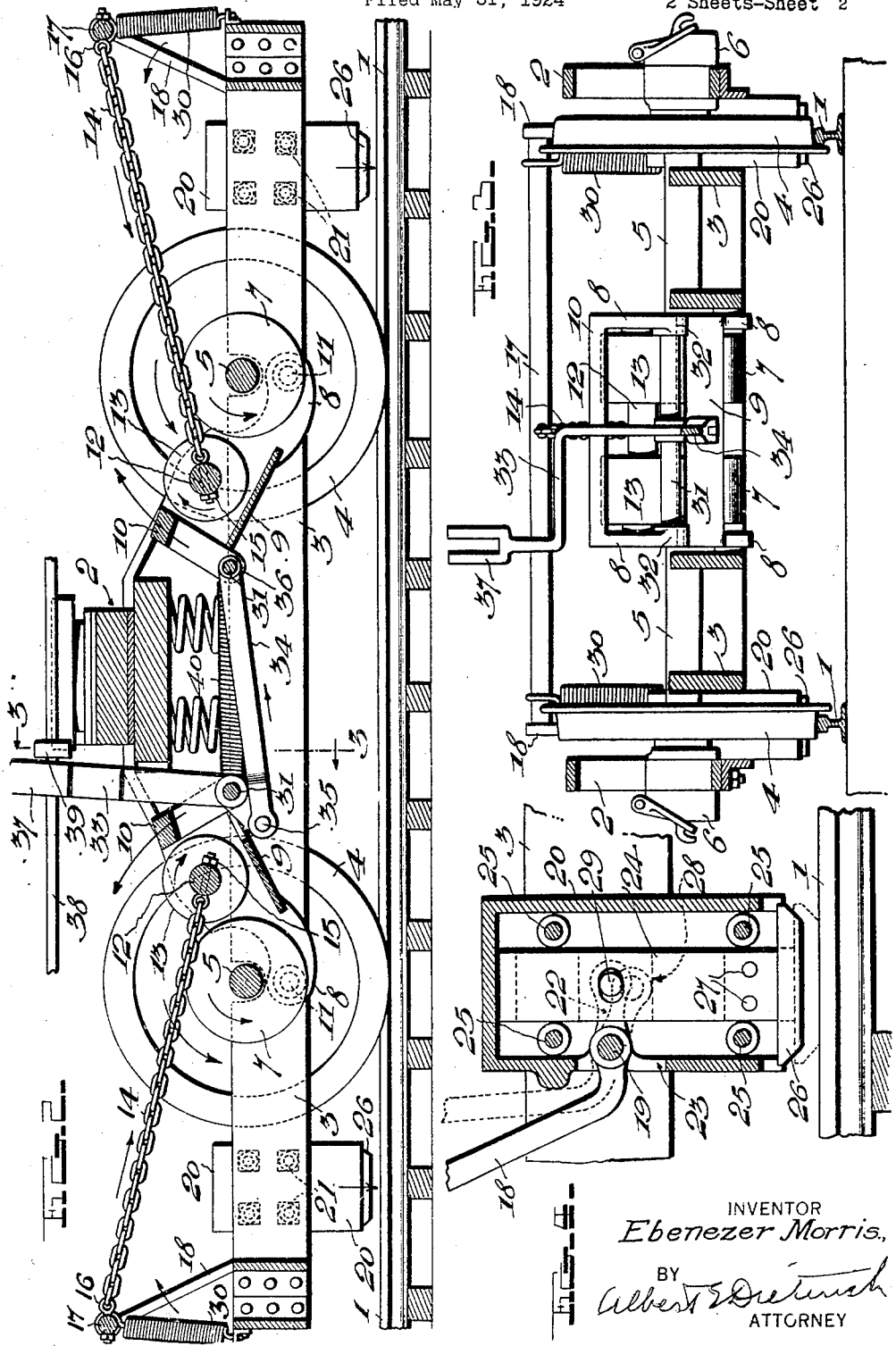

1,573,322

UNITED STATES PATENT OFFICE.

EBENEZER MORRIS, OF AUGUSTA, GEORGIA.

BRAKE DEVICE.

Application filed May 31, 1924. Serial No. 717,058.

*To all whom it may concern:*

Be it known that I, EBENEZER MORRIS, a citizen of the United States, residing at Augusta, in the county of Richmond and State of Georgia, have invented certain new and useful Improvements in Brake Devices, of which the following is a specification.

The invention generally relates to friction brakes and more particularly to that class of such brakes as is adaptable to use on railway trucks.

In the use of wheel-engaging brakes now commonly used, difficulty is experienced in that the brakes act to lock the wheels when applied too vigorously, as in the case of an emergency, thereby causing the wheels to slide without revolving and causing the engaging portions thereof to burn and become flat. Such wheels are thereafter unfit for efficient use as they naturally bump and jar in a noisy manner and with the result of excessive jar and vibration of the truck parts.

Therefore, the invention has for its general object to provide rail engaging brake devices which, while they may be utilized as the sole braking agency, are preferably used in conjunction with any common type of wheel engaging brakes as an auxiliary which may be brought into action in cases of emergency or when the ordinary brakes have, through carelessness or otherwise, applied too vigorously, and for the purpose of relieving the action of the wheels and rendering it impossible to cause a sliding and burning thereof.

In its more detailed nature the invention seeks to provide friction brake shoes adapted to engage and slide on the track rails when the ordinary brakes are applied too vigorously, to effect an easing of the wheels off of the said rails and the desired emergency braking action, mechanism being provided to actuate the shoes through friction set up by the rotation of the wheels themselves at the instance of, and therefore relative to, the ordinary brake setting devices.

With the above and other objects in view the invention further resides in those novel details of construction, combination and arrangement of parts all of which will be first fully described, then be particularly pointed out in the appended claims, reference being had to the accompanying drawings, in which:

Figure 1 is a plan view showing the application of the invention upon a railway truck.

Figure 2 is a vertical central longitudinal section of the parts shown in Figure 1.

Figure 3 is a vertical cross section taken on the line 3—3 on Figure 2.

Figure 4 is a detail vertical, central cross section of one of the shoe carrying housings.

While the invention is adaptable to use as a sole braking agency it is preferably used in conjunction with any of the common type of wheel engaging brakes now used on railway trucks and to act as an auxiliary which may be brought into action in cases of emergency or when the ordinary brakes have, through carelessness or otherwise, been applied too vigorously, and for the purpose of relieving the action of the wheels and rendering it impossible to lock the same to thereby cause a sliding and burning thereof.

In the drawings the invention is illustrated in a manner covering both uses referred to, the combination with the ordinary brake operating rod being illustrated, usual brake structure per se not being shown as it forms of itself no part of the present invention.

In the drawings, in which like numerals of reference indicate like parts in all of the figures, the numeral 1 indicates the track rails, 2 the truck framing, which includes the side bars 3, and 4 the wheels of the truck which are mounted on the usual axles 5, suitably journalled, as at 6.

Each of the axles 5 is provided with a pair of large friction rollers 7 secured upon the said axles to rotate therewith, see Figures 1 and 2. Cooperative with the set of rollers 7, with which each axle is equipped, is a pair of side arms 8 which are joined by lower and upper cross bars 9 and 10 to form a rigid frame adapted to be pivoted, as at 100

11, to the adjacent ones of the side bars 3 of the truck framing. A cross shaft 12 is loosely mounted across each frame and in the opposing arms 8 thereof, and upon each of these cross shafts is fixedly mounted a set of friction rollers 13 in position for being in alignment with and to lie closely adjacent the larger friction rollers 7 upon the respective axle 5.

It will be observed by reference to Figure 1 of the drawings, that the rollers 7 and 13 are spaced apart centrally to permit the passage therebetween in each instance of a chain 14 which is connected as at 15 to the respective cross shaft 12, and as at 16 to the cross bar 17 which, together with the pivoted side arms 18, provide a pivoted yoke frame.

Each of the side arms 18 is pivoted, as at 19, to the rectangular housing 20 with which it it adapted to cooperate. The housing 20 is provided adjacent each of the truck wheels 4, see Figures 1 and 2. Each housing 20 is secured, as at 21, to the adjacent side bar 3 of the truck frame. Each of the pivoted side arms 18 includes a short length crank portion 22 which extends through the opening 23 in the housing, in which the said arm is pivoted, as at 19, into the said housing, see Figure 4.

A stout bar 24 is mounted within each housing 20 in a vertically movable manner and is suitably guided by anti-friction rollers 25. To each of the bars 24 is secured a rail engaging shoe 26 which is suitably secured thereto, as at 27. Each bar 24 is also slotted as at 28 to receive the crank end 22 of the arm 18, which said crank ends are pin and slotted connected as at 29 to the said bar.

A pair of springs 30 are secured to each cross bar 17 of the pivoted yoke frame and to an adjacent portion of the truck framing so as to act in a manner tending to hold the said frame to its normal position, that is, with the bar 24 and its attached shoe held up from engagement with the track rail in the manner illustrated in Figures 2 and 4 of the drawings.

It will be observed from Figure 2 of the drawings that the frames composed of the side arms 8 and cross bars 9 and 10 are so positioned and pivoted as at 11 that the friction rollers 13 carried by that frame will be normally out of contact with, but closely adjacent to, the larger friction rollers 7 secured upon the axles 5, thus making it possible to bring the rollers into tight frictional rolling contact by a relatively slight movement of the said frames on the said pivots.

For providing for the desired movement of the frames just above mentioned and for their movement in unison and in cooperative relation, I provide each of the said frames with a second cross shaft 31 secured in the extended ears 32 of the said frames. Upon one of the cross shafts 31 is pivoted a crank lever which includes a long lever portion and a short crank portion. The end of the short crank portion is link connected, as at 34, to the cross shaft 31 of the opposite frame, the said link 34 being pivoted to that short crank end as at 35, and as at 36 to the said other cross shaft. The long end of the lever 33 is suitably bent and forked as at 37 to be in position for suitably cooperating with the longitudinally movable brake operating rod 38, which said rod is provided with a fixed abutment 39 which is adapted to engage the forked end 37 to move the crank lever in a manner and for the purpose soon to be described.

A pair of springs 40 are connected across between the cross shafts 31 of the opposite frames so as to tend to hold the frames normally to the position illustrated in Figure 2 of the drawings.

Obviously the long or lever arm of the crank 33 may be used as a lever and when rocked in the direction indicated by the arrow on Figure 2 of the drawings would cause a separation of the cross shaft 30 against the tendency of the springs 40 and such as would rock the frames on their pivots 11 to cause the cooperative sets of friction rollers 7 and 13 to engage in tight frictional rolling contact. This would, of course, cause a rotation of the loosely mounted cross shafts 12 and a winding in of the chains 14 and such a rocking of the pivoted frames 17—18 as would cause the forcing of the rail engaging shoe into braking contact with the rails in the manner illustrated in Figure 4 of the drawings.

While the apparatus is adaptable to use as just above described it is preferred to use the apparatus in conjunction with, as an auxiliary to, the usual wheel engaging braking apparatus. In this use the abutment 39 fixed upon the longitudinally movable brake actuated rod 39 is so positioned that it will engage the forked end 37 of the crank 33 above explained, when the ordinary brakes are applied so that the brake shoes 26 will be brought into operation to cooperate therewith. Of course, the abutment 39 may be adjusted so that the said brake shoes 26 will be brought into action at all times when the ordinary wheel brakes are used, but it is preferred that they only be brought into action in emergency cases, as for example when the operator is applying the brakes too vigorously in a manner as would cause a locking and sliding of the wheels. In this instance the abutment 39 will engage the lever end 37 and cause an action of the parts as above described in such a manner that the brake shoes 26 will relieve the pressure of the wheels to a sufficient extent that they will not be burned by sliding over the rails, even if the said wheels should become locked. This relieving action of the brake shoes 26 need not be sufficient to cause a lifting of the wheels from the track and acts in conjunction with the common braking mechanism of the wheels in a manner for effectively preventing flat surfaces being formed on the wheels while permitting normal rail engagement of the wheel flanges at all times.

From the foregoing description, taken in connection with the accompanying drawings, it is thought that all of the novel details of construction of the invention, the manner of operation and the advantages of the same will be readily apparent to those skilled in the art to which it relates.

What I claim is:

1. The combination with a car truck and a longitudinally movable brake operating rod, of shoes movable into and out of engagement with the rails over which the truck travels, box housings for housing the shoes in a vertically movable manner, crank levers for moving the shoes, a friction roller fixed upon the axle of the adjacent wheels of the truck, a pivoted frame, a cross shaft carried by the frame, a friction roller on the cross shaft, connecting means connecting the cross shaft and the shoe moving levers, a friction roller on the cross shaft, and means moved by the brake rod for causing the frame to move and the rollers to engage.

2. The combination with a car truck and a longitudinally movable brake operating rod, of a pair of shoes positioned adjacent each pair of the wheels of the truck and movable into and out of engagement with the rails over which the truck travels, a box housing for each shoe for housing the same in a vertically movable manner, a pair of crank levers for each pair of shoes for moving them in unison, a friction roller upon each axle of the wheels of the truck adjacent each pair of shoes, a pivoted frame associated with each said roller, a cross shaft carried by each frame, a friction roller carried by each cross shaft, a connecting means connecting each cross shaft with the associated pair of crank levers, and lever and link connections connecting the frames and adapted to be moved by action of the brake rod to cause the frames to move in unison to effect engagement of the rollers.

3. The combination with a car truck and a longitudinally movable brake operating rod, of a pair of shoes positioned adjacent each pair of the wheels of the truck and movable into and out of engagement with the rails over which the truck travels, a box housing for each shoe for housing the same in a vertically movable manner, a pair of crank levers for each pair of shoes for moving them in unison, each crank lever being pivoted to the respective housing, a friction roller upon each axle of the wheels of the truck adjacent each pair of shoes, a pivoted frame associated with each said roller, a cross shaft carried by each frame, a friction roller carried by each cross shaft, a chain connecting each cross shaft with the lever and link connections connecting the frames and adapted to be moved by action of the brake rod to cause the frames to move in unison to effect engagement of the rollers.

4. The combination with a car truck and a longitudinally movable brake operating rod, of a pair of shoes positioned adjacent each pair of the wheels of the truck and movable into and out of engagement with the rails over which the truck travels, a box housing for each shoe for housing the same in a vertically movable manner, a pair of crank levers for each pair of shoes for moving them in unison, a friction roller upon each axle of the wheels of the truck adjacent each pair of shoes, a pivoted frame associated with each said roller, a cross shaft carried by each frame, a friction roller carried by each cross shaft, a connecting means connecting each cross shaft with the associated pair of crank levers, and lever and link connections connecting the frames and adapted to be moved by action of the brake rod to cause the frames to move in unison to effect engagement of the rollers, springs for returning the frames to normal position, and other springs for returning the crank levers to normal position.

5. The combination with a car truck and a longitudinally movable brake operating rod, of a pair of shoes positioned adjacent each pair of the wheels of the truck and movable into and out of engagement with the rails over which the truck travels, a box housing for each shoe for housing the same in a vertically movable manner, a pair of crank levers for each pair of shoes for moving them in unison, each crank lever being pivoted to the respective housing, a friction roller upon each axle of the wheels of the truck adjacent each pair of shoes, a pivoted frame associated with each said roller, a cross shaft carried by each frame, a friction roller carried by each cross shaft, a chain connecting each cross shaft with the lever and link connections connecting the frames and adapted to be moved by action of the brake rod to cause the frames to move in unison to effect engagement of the rollers, springs for returning the frames to normal position, and other springs for returning the crank levers to normal position.

6. The combination with a car truck and a longitudinally movable brake operating rod, of shoes movable into and out of engagement with the rails over which the truck travels, box housings for housing the shoes in a vertically movable manner, crank levers for moving the shoes, a friction roller fixed upon the axle of the adjacent wheels of the truck, a pivoted frame, a cross shaft carried by the frame, a friction roller on the cross shaft, a connecting means connecting the cross shaft and the shoe moving levers, a friction roller on the cross shaft, means moved by the brake rod for causing the frame to move and the rollers to engage, and spring elements for returning the crank levers and frame to normal position.

EBENEZER MORRIS.